(12) United States Patent
Yuhara et al.

(10) Patent No.: US 7,187,225 B2
(45) Date of Patent: Mar. 6, 2007

(54) ELECTRONIC CONTROL UNIT

(75) Inventors: Masaharu Yuhara, Tokyo (JP);
Yasuhiro Shiraki, Tokyo (JP);
Kazuhito Okishio, Hyogo (JP);
Hiroshi Nakamura, Tokyo (JP); Hisato Umemaru, Tokyo (JP); Yoshimitsu Takahata, Tokyo (JP); Yasuaki Gotoh, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 36 days.

(21) Appl. No.: 11/201,382

(22) Filed: Aug. 11, 2005

(65) Prior Publication Data

US 2006/0104000 A1    May 18, 2006

(30) Foreign Application Priority Data

Nov. 12, 2004    (JP) ............................. 2004-329311

(51) Int. Cl.
*H03K 5/08* (2006.01)
(52) U.S. Cl. ...................................... 327/309; 327/520
(58) Field of Classification Search ........ 327/101–104, 327/309–310, 331, 520, 594–595
See application file for complete search history.

(56) References Cited

U.S. PATENT DOCUMENTS 6,194,873 B1 * 2/2001 Matsushita .................. 320/137

6,978,029 B1 * 12/2005 Ikeda ........................ 381/111

FOREIGN PATENT DOCUMENTS

| JP | 11-202037 A | 7/1999 |
|----|-------------|--------|
| JP | 11-274672 A | 10/1999 |
| JP | 2002-43525 A | 2/2002 |
| JP | 2003-204166 A | 7/2003 |

* cited by examiner

*Primary Examiner*—My-Trang Nu Ton
(74) *Attorney, Agent, or Firm*—Sughrue Mion, PLLC

(57) ABSTRACT

This invention provides an electronic control unit is capable of suppressing electromagnetic noise having a frequency band used in a portable wireless apparatus, and capable of exhibiting a noise resistance property against electromagnetic noise. The electronic control unit including a constant voltage power supply circuit portion, an analog signal inputting circuit portion, and a conversion processing circuit portion, an analog sensor and a driving power supply being connected to the outside, and the unit being connected to the analog sensor through a power supply line and a signal line, in which the analog signal inputting circuit portion includes a current limiting circuit portion, an integrating circuit portion, a current limiting resistor, a signal noise absorbing circuit, and a first bypass capacitor, and capacitance (C1) and parasitic inductance (L1) of the first bypass capacitor are set in a range of $7 \times 10^6 < 1/[2\pi\sqrt{(L1 \times C1)}] < 35 \times 10^6$.

7 Claims, 3 Drawing Sheets

ELECTRONIC CONTROL UNIT

BACKGROUND OF THE INVENTION

1. Field of the Invention

The present invention relates to an electronic control unit for suppressing electric wave noise induced in a power supply line and a signal line.

2. Description of the Related Art

Heretofore, in order to suppress noise in an electronic apparatus, there has often been employed a method of inserting capacitors between a signal line and a ground line, and between positive and negative power supply lines.

As regards a conventional magnetic signal detecting device, in a magnetic signal detecting device utilized in a mobile communication apparatus such as a mobile telephone or a cordless telephone, an output signal from a magnetic resistance element constituted by a resistance bridge is grounded by employing a structure in which a non-inverted input terminal of a diffractive type operational amplification circuit constituted by a first operational amplifier and a second operational amplifier is grounded through a capacitor to enhance a noise resistance property, thereby preventing malfunction (refer to JP 11-202037 A for example).

In addition, in a conventional semiconductor integrated circuit device, circuit blocks are disposed in the order of increasing noise level between a power supply input terminal and a ground wiring and bypass capacitors are disposed in the respective circuit blocks to reduce an inductance component, thereby preventing an increase in impedance in a high frequency region is prevented to absorb power supply noise (refer to JP 2002-043525 A for example).

In the magnetic signal detecting device disclosed in JP 11-202037 A, a suitable capacity of the capacitor to be inserted is not specified. As a result, there has been a problem in that the responsibility to a detection signal becomes worse when the capacitance value is excessively large, while the noise cannot be suppressed sufficiently when the capacitance value is too small.

In addition, in the semiconductor integrated circuit device disclosed in JP 2002-043525 A, there is shown only a condition in which a wiring impedance is much larger than an internal parasitic inductance of the capacitor. Thus, there has also been encountered a problem in that the suitable capacitance values of the bypass capacitors are not clear.

Moreover, as to the noise resistance property of the electronic apparatus against the electric wave noise, the noise resistance property against the strong transmitted electric wave from the portable wireless apparatus such as a mobile telephone or a transceiver which is used in a nearby style is more important as compared to the noise resistance property against the received electric waves having various frequency bands. However, the magnetic signal detecting device disclosed in JP 11-202037 A and the semiconductor integrated circuit device disclosed in JP 2002-043525 A are incapable of handling this problem.

SUMMARY OF THE INVENTION

The present invention has been made in order to solve the above-mentioned problems. It is an object of the present invention to provide an analog signal inputting circuit, for an analog signal line susceptible to electric wave noise, which is capable of being specialized to a frequency band (7 to 35 MHz) of a transmission wave generated by a portable wireless apparatus such as a mobile telephone, a transceiver, or an automobile wireless installation to inexpensively and effectively suppress the noise, and is also capable of holding a noise resistance property against a weak reception electric wave having a frequency band other than the frequency band (7 to 35 MHz) of a transmission wave generated by a portable wireless apparatus, and against various electromagnetic noise generated by an environment under which an electronic device is installed.

According to the present invention, there is provided an electronic control unit powered from a driving power supply and connected to an analog sensor through a wire harness accommodating at least a power supply line and a signal line, including: a constant voltage power supply circuit portion for generating a regulated voltage based on the power feeding from the driving power supply; an analog signal inputting circuit portion connected to the constant voltage power supply circuit portion; and a conversion processing circuit portion to which a detection signal from the analog sensor is supplied through the signal line, the analog signal inputting circuit portion including: a current limiting circuit portion inserted into a power supply line of the constant voltage power supply circuit portion for powering the analog sensor through the power supply line; an integrating circuit portion inserted between an input signal line connected to the signal line and the conversion processing circuit portion; a current limiting resistor inserted between the input signal line and the integrating circuit portion; a signal noise absorbing circuit portion connected to the power source line, a ground line of the constant voltage power supply circuit portion, and the input signal line; and a first bypass capacitor inserted between an output terminal of the current limiting circuit portion and the ground line, in which an electrostatic capacity (C1) and a parasitic inductance (L1) of the first bypass capacitor are set in a range expressed by Equation (1):

$$7 \times 10^6 < 1/[2\pi \sqrt{(L1 \times C1)}] < 35 \times 10^6 \qquad (1)$$

According to the electronic control unit of the present invention, electromagnetic noise which are induced in a power supply line or a signal line by a strong transmission electric wave from a portable wireless apparatus such as a mobile telephone or a transceiver which is used in a nearby style can be discharged to the ground line through the bypass capacitor, thereby making it possible to suppress the electromagnetic noise.

In addition, the power supply line through which an electric power is supplied to the analog sensor is powered from the current limiting circuit portion. Thus, even when the power supply line is erroneously grounded, the constant voltage controlling circuit portion is prevented from being damaged, and hence the electronic control unit can be prevented from abnormally operating.

Also, since other noise generated in an analog signal line are removed through the signal noise absorbing circuit and the integrating circuit portion, it is possible to obtain the electronic control unit which is generally safe and exhibits a high degree of noise resistance property.

DETAILED DESCRIPTION OF THE PREFERRED EMBODIMENTS

Figure 1:
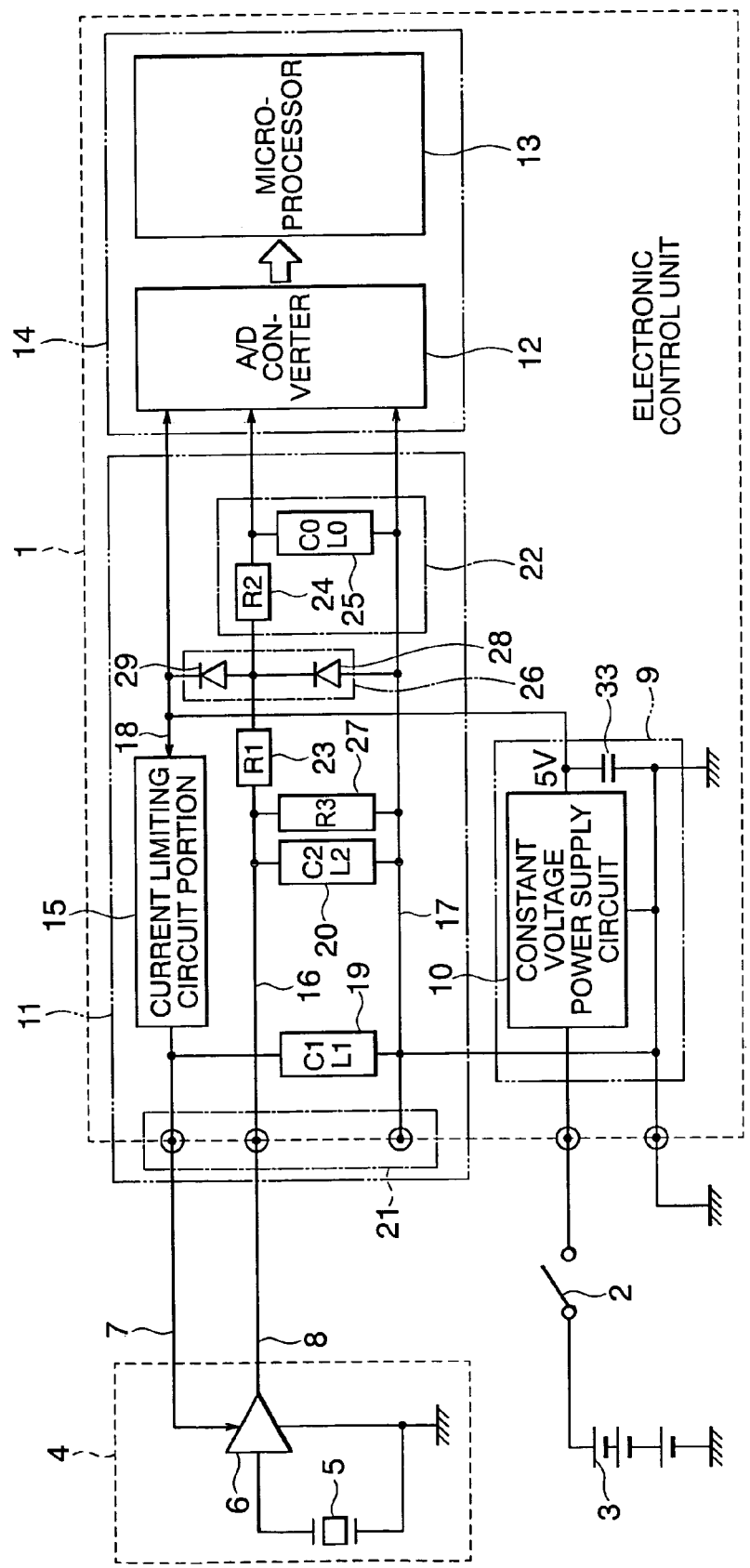
FIG. 1 is a block diagram, partly in circuit diagram, showing a configuration of an electronic control unit according to Embodiment 1 of the present invention together with a configuration of peripheral units.

Embodiments of the present invention will hereinafter be described in detail with reference to the accompanying drawings. In the drawings, the same or corresponding members or portions are designated with the same reference numerals.

Embodiment 1

FIG. 1 is a block diagram, partly in circuit diagram, showing a configuration of an electronic control unit according to Embodiment 1 of the present invention together with a configuration of peripheral units.

In FIG. 1, a driving power supply 3 which is powered through a power supply switch 2, and an analog sensor 4 for transmitting a detection signal to an electronic control unit 1 are connected from the outside to the electronic control unit 1.

The analog sensor 4 includes a sensor element 5 as a detection element, and an amplification circuit portion 6 for amplifying a signal outputted from the sensor element 5.

Here, a power supply line 7 and a signal line 8 through which the analog sensor 4 is connected to the electronic control unit 1 are accommodated in a common wire harness (not shown).

An electric power for the analog sensor 4 is supplied from the electronic control unit 1 through the power supply line 7, and the detection signal from the analog sensor 4 is supplied to the electronic control unit 1 through the signal line 8.

In addition, the electronic control unit 1 includes a constant voltage power supply circuit portion 9 which is powered from the driving power supply 3 to supply a regulated voltage to circuit elements, an analog signal inputting circuit portion 11 connected to the constant voltage power supply circuit portion 9, and a conversion processing circuit portion 14 to which the detection signal from the analog sensor 4 is supplied. The conversion processing circuit portion 14 includes an A/D converter 12 and a microprocessor 13.

Here, the electronic control unit 1, the driving power supply 3, and the analog sensor 4 are grounded to a common electric conductor.

The constant voltage power supply circuit portion 9 is powered from the driving power supply 3 through a power supply switch 2. The constant voltage power supply circuit portion 9 includes a constant voltage power supply circuit 10 for generating a regulated voltage of DC 5 V for example, and a smoothing capacitor 33 with a relatively large capacity which is connected between an output terminal and a ground line 17.

The conversion processing circuit portion 14 includes the A/D converter 12 for outputting the detection signal inputted from the analog sensor 4 through the analog signal inputting circuit portion 11 in the form of a digital signal, and the microprocessor 13 to which the digital signal from the A/D converter 12 is inputted so that the microprocessor 13 can perform a monitoring and control function in accordance with an application purpose.

Note that a circuit configuration may also be adopted in which an analog comparator is used instead of the A/D converter 12 for comparing the magnitude of the voltage of the detection signal with the magnitude of a predetermined comparison reference voltage, and the comparison results are inputted to the microprocessor 13.

The analog signal inputting circuit portion 11 includes a current limiting circuit portion 15, an input signal line 16, a ground line 16, a power supply line 18, a connector 21, a first bypass capacitor 19, a second bypass capacitor 20, a current limiting resistor 23, an integrating circuit portion 22, a signal noise absorbing circuit 26, and a pull-down resistor 27.

The current limiting circuit portion 15 is provided in a power feeding circuit from the constant voltage power supply circuit portion 9 to the analog sensor 4, and mainly constituted by an operational amplifier. Thus, when the power supply line 7 is grounded, the damage of at least the constant voltage power supply circuit portion 9 is avoided to prevent the overall electronic control unit 1 from being damaged or caused to malfunction.

Each of the input signal line 16 connected to the signal line 8, the ground line 17 connected to a negative side terminal of the constant voltage power supply circuit portion 9, and the power supply line 18 connected to a positive side terminal of the constant voltage power supply circuit portion 9 is constituted by an electrically conductive pattern formed on a surface of a printed wiring board.

The connector 21 is provided in an end portion of the analog signal inputting circuit portion 11. The power supply line 7 and the signal line 8 are respectively connected to the power supply line 18 and the input signal line 16 through the connector 21.

The first bypass capacitor 19 is inserted between an output terminal of the current limiting circuit portion 15 and the ground line 17. The first bypass capacitor 19 has an electrostatic capacity of C1 (F) and an internal parasitic inductance of L1 (H).

The second bypass capacitor 20 is inserted between the input signal line 16 and the ground line 17. The second bypass capacitor 20 has an electrostatic capacity of C2 (F) and an internal parasitic inductance of L2 (H).

The first bypass capacitor 19 is provided in a position near the connector 21 side, and the second bypass capacitor 20 is provided in a position close to the A/D converter 12. The electrostatic capacity C1 and the internal parasite inductance L1 of the first bypass capacitor 19, and the electrostatic capacity C2 and the internal parasite inductance L2 of the second bypass capacitor 20 are set in ranges expressed by Equations (4) and (5), respectively:

$$7 \times 10^6 < 1/[2\pi\sqrt{(L1 \times C1)}] < 35 \times 10^6 \quad (4)$$

$$35 \times 10^6 < 1/[2\pi\sqrt{(L2 \times C2)}] \text{ or}$$

$$1/[2\pi\sqrt{(L2 \times C2)}] < 7 \times 10^6 \quad (5)$$

The current limiting resistor 23 is connected at its one end to the input signal line 16, and is connected at its other end to an analog input terminal of the A/D converter 12 through the integrating circuit portion 22. The current limiting resistor 23 has a resistance value R1 and serves to limit a current so that the amount of a circulating noise current does not become excessively large.

In addition, the integrating circuit portion 22 as a low-pass filter is constituted by an integrating resistor 24 having a resistance value R2, and an integrating capacitor 25. The integrating resistor 24 is inserted between the current limiting resistor 23 and the analog input terminal of the A/D converter 12, and the integrating capacitor 25 is inserted between the integrating resistor 24 and the ground line 17.

The integrating circuit portion 22 serves to take out a stable signal from the detection signal containing high frequency noise.

Here, a composite resistor is constituted by the current limiting resistor 23 and the integrating resistor 24. A composite resistance value R0 (=R1+R2) of the resistance value R1 of the current limiting resistor 23 and the resistance value R2 of the integrating resistor 24 is much larger than an impedance value of the second bypass capacitor 20 in a frequency band of 7 to 35 MHz of a transmission wave generated by a portable wireless apparatus.

The signal noise absorbing circuit 26 is inserted among the input signal line 16, the power supply line 18, and the ground line 17. The signal noise absorbing circuit 26 includes a negative side diode 28 inserted between the ground line 17 and the input signal line 16, and a positive side diode 29 inserted between the input signal line 16 and the power supply line 18.

Here, the negative side diode 28 operates when an excessive noise voltage having a negative polarity invades into the input signal line 16. The negative side diode 28 serves to prevent the situation where the noise current circulates in a direction from the ground line 17 to a node between the current limiting resistor 23 and the integrating resistor 24, and a negative voltage is applied to the integrating circuit portion 22.

In addition, the positive side diode 29 operates when an excessive noise voltage having a positive polarity invades into the signal line 16. The positive side diode 29 serves to prevent the situation where the noise current circulates in a direction from the node between the current limiting resistor 23 and the integrating resistor 24 to the power supply line 18, and a positive voltage equal to or larger than the power supply voltage is applied to the integrating circuit portion 22.

Note that when the analog sensor 4 generates positive and negative detection signals, and the constant voltage power supply circuit portion 9 supplies the regulated voltage to the analog sensor 4 through the positive power supply line 18 and a negative power supply line (not shown), an anode terminal of the negative side diode 28 connected to the ground line 17 is connected to the negative power supply line.

A pull-down resistor 27 inserted between the input signal line 16 and the ground line 17 serves to shift an input level of the detection signal to a level of the ground line 17 when imperfect contact or the like is caused in a connection pin of the connector 21, thereby providing a failsafe state.

Note that there may be some cases where pull-up to the power supply line 18 or pull-down to the negative power source is the failsafe.

In addition, the pull-down resistor 27 and a pull-up resistor 32 (refer to FIG. 3) may also be simultaneously provided.

In any case, each of resistance values of the pull-down resistor 27 and the pull-up resistor 32 for the failsafe is set to a sufficiently large value as compared to the composite resistance value R0(=R1+R2) of the resistance value R1 of the current limiting resistor 23 and the resistance value R2 of the integrating resistor 24.

Hereinafter, an operation of the electronic control unit 1 having the above-mentioned configuration will be described.

When the power supply switch 2 is turned on, the constant voltage power supply circuit portion 9 supplies the regulated constant voltage to each of the circuit elements within the electronic control unit 1, and also supplies an electric power from the current limiting circuit portion 15 to the analog sensor 4 through the power supply line 7.

The detection signal outputted from the analog sensor 4 is transmitted to the conversion processing circuit portion 14 through the signal line 8 and the input signal line 16.

The A/D converter 12 converts the detection signal from the analog sensor 4 into a digital value to output the resultant digital value to the microprocessor 13. The microprocessor 13 read out a value which is converted into the digital value and also reads out other analog signals and digital signals to control an output unit or the like (not shown) in accordance with an application purpose.

Here, the electrostatic capacity C1 and the internal parasitic inductance L1 of the first bypass capacitor 19 are set so as to make the impedance minimum for the noise within a frequency band of 7 to 35 MHz of a transmission wave generated by a portable wireless apparatus and to be induced in the power supply line 7. Hence, the noise current can be discharged to the ground line 17.

In addition, the electrostatic capacity C2 and the internal parasitic inductance L2 of the second bypass capacitor 20 are set so as to make the impedance minimum for the noise within a frequency band other than the frequency band of 7 to 35 MHz of the transmission wave generated by the portable wireless apparatus to be induced in the signal line 8. Hence, the noise current can be discharged to the ground line 17.

In addition, the impedance of the second bypass capacitor 20 in the frequency band of 7 to 35 MHz of the transmission wave generated by the portable wireless apparatus has such a small value as to be disregardable as compared with the composite resistance value R0(=R1+R2) of the resistance values R1 and R2 of the current limiting resistor 23 and the integrating resistor 24 which are inserted between the second bypass capacitor 20 and the integrating capacitor 25 provided in the integrating circuit portion 22. Hence, the noise current having the frequency band of 7 to 35 KHz can be suppressed, and it is possible to suppress the noise voltage invading into a weak electric wave having a frequency band other than the frequency band of 7 to 35 KHz.

Also, the noise current originating from other noise independent of the transmission wave generated by the portable wireless apparatus is permitted to circulate based on the operation of the negative side diode 28 and the positive side diode 29 which are provided in the signal noise absorbing circuit 26.

Also, the detection signal containing the high frequency noise is outputted as a stable signal through the integrating circuit portion 22 as the low-pass filter.

Note that the microprocessor 13 may not be used depending on the type of the control in some cases.

That is, a configuration may also be adopted for the conversion processing circuit portion 14 in which a comparison circuit is used instead of the A/D converter 12, a flip-flop circuit for storing therein information on a comparison output operation is used instead of the microprocessor 13 in the processing circuit portion, and the sensor element 5 is an oxygen concentration detecting element. In this case, when a value of the oxygen concentration becomes equal to or smaller than a predetermined value, the comparison circuit operates, and the flip-flop circuit stores therein information of the operation of the comparison circuit, thereby driving a warning display output.

At this time, even when a temporary malfunction is caused due to the noise, the flip-flop circuit stores and preserves therein information on the malfunction. Hence, the noise resistance property of the input signal circuit is especially regarded as important.

Figure 2:
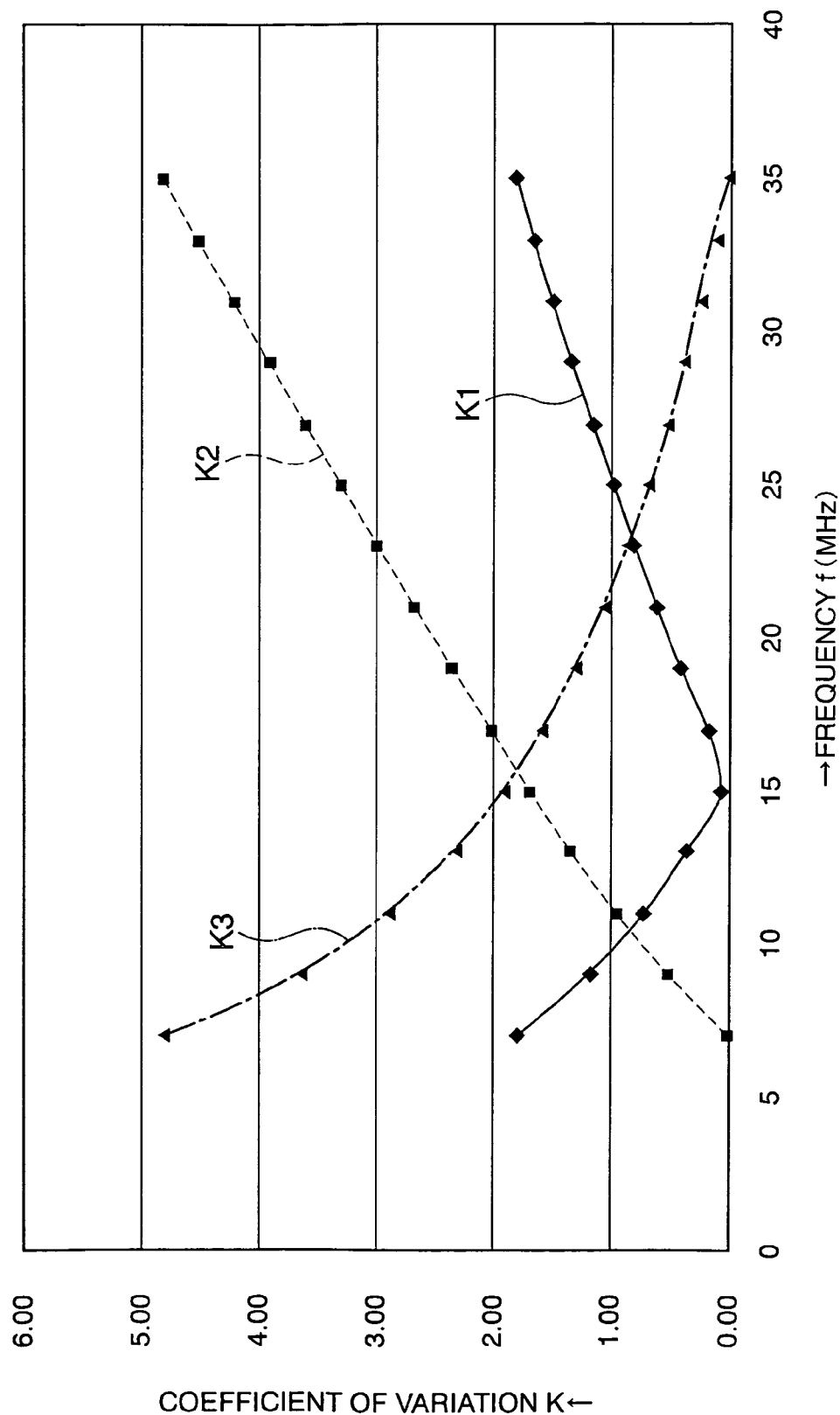
FIG. 2 is a graphical representation explaining a change of an impedance depending on a frequency in Embodiment 1 of the present invention.

FIG. 2 is a graphical representation explaining the dependency of a change in impedance on the frequency in Embodiment 1 of the present invention.

In FIG. 2, an axis of abscissa represents the frequency f MHz of the electromagnetic noise, and an axis of ordinate represents a coefficient K of variation showing how the impedance $Z1=j(\omega L1 -1/\omega C1)$ of the first bypass capacitor 19 fluctuates as the frequency $f=\omega/2\pi$ MHz changes.

In addition, a curve represented by a solid line shows the coefficient K1 of variation when the resonance frequency of the impedance Z1 is $f0=\sqrt{(7\times35)}=15.6$ MHz at which the coefficient K of variation takes the smallest value in terms of an area average of the frequency band of 7 to 35 MHz of the transmission wave generated by the portable wireless apparatus.

In addition, a curve represented by a dotted line shows the coefficient K2 of variation when the resonance frequency f0=7 MHz of the impedance Z1, and a curve represented by a dashed line shows the coefficient K3 of variation when the resonance frequency f0=35 MHz of the impedance Z1.

Note that when the resonance frequency is assigned f0 MHz, and the resonance angular frequency is assigned $\omega 0$ rad/sec, an absolute value |Z1| of the impedance Z1 is expressed by Equation (6):

$$|Z1|=|(\omega/\omega 0)-(\omega 0/\omega)|/(\omega 0 C) \quad (6)$$

where $\omega 0=2\pi f0=1/\sqrt{(L1\times C1)}$

Also, the coefficient K of variation represented by the axis of ordinate in FIG. 2 is expressed by Equation (7):

$$K=|(\omega/\omega 0)-(\omega 0/\omega)|=|(f/f0)-(f0/f)| \quad (7)$$

When the frequency is in the range of 7 to 35 MHz, a maximum value of each of the coefficients K2 and K3 of variation is 4.8, and a maximum value of the coefficient K1 of variation is 1.8.

Here, in a case where the electrostatic capacity C1 of the first bypass capacitor 19 is 0.01 µF, when the frequency f0 MHz is set in the range of 7 to 35 MHz, a value of $1/\omega 0\times C1$ falls in a range of $1/(2\pi\times7\times10^{6}\times0.01\times10^{-6})=0.45$ Ω to $1/(2\pi\times35 \times10^{6}\times0.01\times10^{-6})=2.27$ Ω. Here, even if those values are multiplied by the maximum value 4.8 of the coefficient K of variation, each of the resultant values becomes equal to or smaller than 10.9 Ω as the resistance value. Thus, the sufficient small resistance value is obtained which causes no problem in a circuit specification.

In addition, in a case where the electrostatic capacity C1 of the first bypass capacitor 19 is 0.1 µF, when the frequency f0 MHz is set in the range of 7 to 35 MHz, a value of $1/\omega 0\times C1$ falls in a range of 0.045 Ω to 0.227 Ω. Here, even if those values are multiplied by the maximum value 4.8 of the coefficient K of variation, each of the resultant values becomes equal to or smaller than 1.09 Ω as the resistance value. Thus, the further sufficient small resistance value is obtained.

The same holds true for the second bypass capacitor 20. That is, the sufficient small resistance value can be obtained as compared with the composite resistance value R0 (=R1+R2) of the resistance value R1 of the current limiting resistor 23 and the resistance value R2 of the integrating resistor 24.

As described above, even in the case of the compact and inexpensive capacitor having a small capacity, by using the capacitor adapted to resonate at the frequency of the target noise, the sufficient small impedance can be ensured in the frequency band of 7 to 35 MHz of the transmission wave generated by the portable wireless apparatus.

In particular, when the first bypass capacitor 19 is a chip type ceramic capacitor, the resonance is obtained in the frequency band of 7 to 35 MHz of the transmission wave generated by the portable wireless apparatus due to the presence of the internal parasitic inductance. Hence, the compact capacitor can be mounted on an electronic board at low cost.

In the electronic control unit 1 according to Embodiment 1 of the present invention, the electrostatic capacity C1 and the internal parasitic inductance L1 of the first bypass capacitor 19 are set so that the impedance takes minimum value for the noise which has the frequency band of 7 to 35 MHz of the transmission wave generated by the portable wireless apparatus to be induced in the power supply line 7. Hence, the noise current can be discharged to the ground line 17 to suppress the electromagnetic noise.

The electrostatic capacity C2 and the internal parasitic inductance L2 of the second bypass capacitor 20 are set so that the impedance takes minimum value for the noise which have a frequency band other than the frequency band of 7 to 35 MHz of the transmission wave generated by the portable wireless apparatus to be induced in the signal line 8. Hence, the noise current can be discharged to the ground line 17 to suppress the electromagnetic noise.

In addition, the impedance of the second bypass capacitor 20 in the frequency band of 7 to 35 MHz of the transmission wave generated by the portable wireless apparatus has a value small enough to be disregardable as compared with the composite resistance value R0 (=R1+R2) of the resistance values R1 and R2 of the current limiting resistor 23 and the integrating resistor 24 which are inserted between the second bypass capacitor 20 and the integrating capacitor 25 provided in the integrating circuit portion 22.

Accordingly, it is possible to suppress the noise current flowing into the input signal line 16 in the transmission frequency band of the portable wireless apparatus, and it is also possible to suppress the noise voltage invading into the weak electric wave having a frequency band other than the frequency band of 7 to 35 MHz.

In addition, a chip type ceramic capacitor having an electrostatic capacity of 0.01 to 0.1 µF is used as the first bypass capacitor 19.

Accordingly, the electronic control unit has a feature that the electromagnetic noise which are induced in the signal line 8 by the transmission wave generated by the portable wireless apparatus can be suppressed by using the compact and inexpensive chip type ceramic capacitor, without an inductance element to be added.

In addition, the power supply line 7 through which the electric power is supplied to the analog sensor 4 is powered from the current limiting circuit portion 15. Thus, even when the power supply line 7 is erroneously grounded, the constant voltage controlling circuit portion can be prevented from being damaged, and abnormal operation of the electronic control unit 1 can also be prevented.

In addition, other noise generated in the signal line 8 are removed through the signal noise absorbing circuit 26 and the integrating circuit portion 22. Thus, it is possible to obtain the generally safe electronic control unit 1 which exhibits high degree of noise resistance property.

Also, by providing the pull-down resistor 27 or the pull-up resistor 32, when the imperfect contact or the like is caused in a connection pin of the connector 21, the input level of the detection signal can be shifted to a level of the ground line 17 or the power supply line 18 to provide the failsafe state. Hence, the circuit can be stabilized.

Embodiment 2

Figure 3:
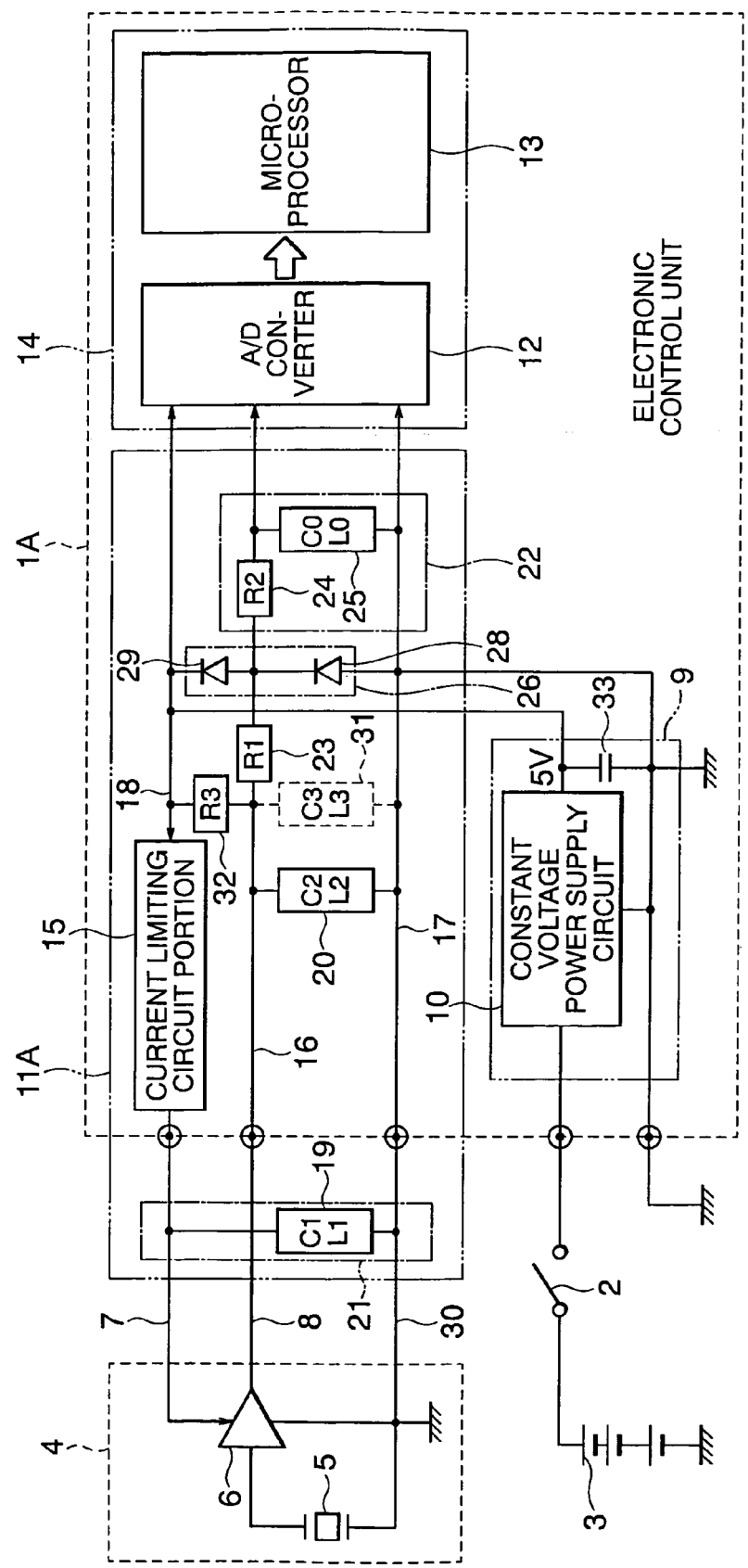
FIG. 3 is a block diagram, partly in circuit diagram, showing a configuration of an electronic control unit according to Embodiment 2 of the present invention together with a configuration of peripheral units.

FIG. 3 is a block diagram, partly in circuit diagram, showing a configuration of an electronic control unit 1A according to Embodiment 2 of the present invention together with a configuration of peripheral units. Here, with respect to the same or corresponding constituent elements to those in Embodiment 1, "A" is added to each of the same reference numerals, and detailed descriptions are omitted.

In FIG. 3, the electronic control unit 1A as an engine control unit for an automobile is powered by the driving power supply 3 as an on-vehicle battery through the power supply switch 2.

In addition, the analog sensor 4 includes the sensor element 5 as a pressure sensor for measuring an atmospheric pressure within an inlet pipe, and the amplification circuit portion 6.

Here, the first bypass capacitor 19 is a chip type ceramic capacitor having an electrostatic capacity of 0.01 to 0.1 μF, and the second bypass capacitor 20 is a chip type ceramic capacitor having an electrostatic capacity of 500 to 5,000 pF.

The electric power for the analog sensor 4 is supplied from the electronic control unit 1A through the power supply line 7 and a ground line 30. The detection signal from the analog sensor 4 is transmitted to the electronic control unit 1A through the signal line 8 and the input signal line 16.

Here, the power supply line 7, the signal line 8, and the ground line 30 through which the analog sensor 4 is connected to the electronic control unit 1A are accommodated within the common wire harness (not shown).

In addition, the electronic control unit 1A, the driving power supply 3, and the analog sensor 4 are grounded to a common electric conductor (car body).

Here, the first bypass capacitor 19 is built in a wire harness side of the connector 21. The electrostatic capacity and the internal parasitic inductance of the first bypass capacitor 19 are set in the same range as that in Embodiment 1.

The second bypass capacitor 20 is inserted between the input signal line 16 and the ground line 17. Its electrostatic capacity is C2, and its internal parasitic inductance is L2. The electrostatic capacity C2 and the internal parasitic inductance L2 are set in the same range as that in Embodiment 1.

A third bypass capacitor 31 is connected in parallel with the second bypass capacitor 20. Its electrostatic capacity is C3, and its internal parasitic inductance is L3. The third bypass capacitor 31 is a capacitor which is added as necessary.

Here, the second and third bypass capacitors 20 and 31 are provided in positions near the A/D converter 12. The electrostatic capacities and the internal parasitic inductances of the second and third bypass capacitors 20 and 31 are set in a range expressed by Equation (8):

$$7 \times 10^6 < 1/[2\pi\sqrt{\{(L2+L3) \times (C2 \times C3)/(C2+C3)\}}] < 35 \times 10^6 \quad (8)$$

Here, in Equation (8), assuming that a denominator of $(Z2+Z3)$ of a composite impedance $Z (=Z2 \times Z3/(Z2+Z3))$ of an impedance $Z2 (=j(\omega L2-1/(\omega C2))$ of the second bypass capacitor 20 and an impedance $Z3(=j(\omega L3-1/(\omega C3))$ of the third bypass capacitor 31 is zero, a parallel resonance frequency f0 MHz in which a value of the composite impedance Z is infinite is set in a range of the frequency band of 7 to 35 MHz of the transmission wave generated by the portable wireless apparatus.

In addition, the resonance frequency f0 MHz and the resonance angular frequency $w0=2\pi f0$ rad/sec are calculated using Equation (9):

$$(\omega 0 L2 - 1/\omega 0 C2) + (\omega 0 L3 - 1/\omega 0 C3) = 0$$

$$\therefore \omega 0 (L2+L3) = 1/\omega 0 C2 + 1/\omega 0 C3$$

$$\therefore \omega 0^2 (L2+L3) C2 \times C3 = C2 + C3$$

$$\therefore f0 = \omega 0/2\pi = 1/[2\pi\sqrt{\{(L2+L3) \times (C2 \times C3)/(C2+C3)\}}] \quad (9)$$

In addition, the pull-up resistor 32 is a resistor inserted between the input signal line 16 and the power supply line 18. When the imperfect contact is caused in a connection pin of the connector 21, the input level of the detection signal is biased to a maximum voltage through the pull-up resistor 32 to provide the failsafe.

Hereinafter, an operation of the electronic control unit 1A having the above-mentioned configuration will be described.

The electrostatic capacity C1 and the internal parasitic inductance L1 of the first bypass capacitor 19 are set so that the impedance becomes minimum for the noise which have the frequency band of 7 to 35 MHz of the transmission wave generated by the portable wireless apparatus to be induced in the power supply line 7. Hence, the noise current can be discharged to the ground line 17.

In addition, the electrostatic capacity C2 and the internal parasitic inductance L2 of the second bypass capacitor 20 are set so that the impedance becomes minimum for the noise which have the frequency band other than the frequency band of 7 to 35 MHz of the transmission wave generated by the portable wireless apparatus to be induced in the signal line 8. Hence, the noise current can be discharged to the ground line 17.

In addition, the electrostatic capacities and the internal parasitic inductances of the second and third bypass capacitors 20 and 31 are set so that the impedance becomes maximum for the noise which have the frequency band of 7 to 35 MHz of the transmission wave generated by the portable wireless apparatus to be induced in the signal line 8. Hence, the noise can hardly invade into the input signal line 16.

In the electronic control unit 1A according to Embodiment 2 of the present invention, the electrostatic capacities and the internal parasitic inductances of the second and third bypass capacitors 20 and 31 become the parallel resonance state and thus causes the impedance to become maximum for the noise which have the frequency band of 7 to 35 MHz of the transmission wave generated by the portable wireless apparatus to be induced in the signal line 8. Hence, the noise current which is induced in the signal line 8 to invade into the input signal line 16 can be most effectively suppressed.

In addition, it is also possible to suppress the noise voltage which invades into a weak electric wave having a frequency band other than the frequency band of 7 to 35 MHz.

Also, the first bypass capacitor 19 is provided within the connector 21 on a wire harness side. Thus, even when the imperfect contact or the like is caused in a connection pin of the counter 21, the noise current is caused to flow through the first bypass capacitor 19 to suppress the inducement of the voltage in the signal line 8.

As a result, it is possible to prevent the situation where the noise invade into the signal line 8 to cause the abnormal malfunction in the electronic control unit 1A.

Moreover, the resonance frequency of the circuit depends on the electrostatic capacities C1, C2, and the internal parasitic inductances L1, L2 of the first and second bypass capacitors 19 and 20. Hence, the electronic control unit has a feature that the resonance frequency of the circuit can be determined without depending on a wiring pattern within the electronic control circuit 1A.

In addition, the chip type ceramic capacitor having the electrostatic capacity of 0.01 to 0.1 µF is used as the first bypass capacitor 19, and the chip type ceramic capacitor having the electrostatic capacity of 500 to 5,000 pF is used as the second bypass capacitor 20. For this reason, in a case of the fuel injection control or the ignition control in which even a transitory noise malfunction leads to a situation where an engine is stopped and the engine can not self-recovered, the electromagnetic noise which are induced in the signal line 8 due to the transmission wave generated by the portable wireless apparatus can be suppressed without specially adding an inductance element, by using the compact and inexpensive chip type ceramic capacitors. Hence, the noise resistance property can be sufficiently enhanced.

Also, the electronic control unit has a feature that it is possible to suppress the noise voltage invading into the weak electric wave having a higher frequency band. It is thus possible to prevent such a trouble that an engine in running suddenly stops from occurring.

What is claimed is:

1. An electronic control unit powered from a driving power supply and connected to an analog sensor through a wire harness accommodating at least a power supply line and a signal line, comprising:
    a constant voltage power supply circuit portion for generating a regulated voltage based on the power feeding from the driving power supply;
    an analog signal inputting circuit portion connected to the constant voltage power supply circuit portion; and
    a conversion processing circuit portion to which a detection signal from the analog sensor is supplied through the signal line,
    the analog signal inputting circuit portion comprising:
    a current limiting circuit portion inserted into a power supply line of the constant voltage power supply circuit portion for powering the analog sensor through the power supply line;
    an integrating circuit portion inserted between an input signal line connected to the signal line and the conversion processing circuit portion;
    a current limiting resistor inserted between the input signal line and the integrating circuit portion;
    a signal noise absorbing circuit portion connected to the power source line, a ground line of the constant voltage power supply circuit portion, and the input signal line; and
    a first bypass capacitor inserted between an output terminal of the current limiting circuit portion and the ground line,
    wherein an electrostatic capacity (C1) and a parasitic inductance (L1) of the first bypass capacitor are set in a range expressed by Equation (1):

$$7 \times 10^6 < 1/[2\pi \sqrt{(L1 \times C1)}] < 35 \times 10^6 \tag{1}$$

2. An electronic control unit according to claim 1, wherein the input signal line is connected to the power supply line of the constant voltage power supply circuit portion through a pull-up resistor.

3. An electronic control unit according to claim 1, wherein the input signal line is connected to the ground line of the constant voltage power supply circuit portion through a pull-down resistor.

4. An electronic control unit according to claim 1, wherein the analog signal inputting circuit portion further comprises a second bypass capacitor inserted between the input signal line and the ground line, an electrostatic capacity (C2) and a parasitic inductance (L2) of the second bypass capacitor are set in a range expressed by Equation (2):

$$35 \times 10^6 < 1/[2\pi \sqrt{(L2 \times C2)}]$$

or $$1/[2\pi \sqrt{(L2 \times C2)}] < 7 \times 10^6 \tag{2}$$

and an impedance of the second bypass capacitor in a frequency band of 7 to 35 MHz has a sufficiently small value as compared to that of a composite impedance of a resistance of an integrating resistor provided in the integrating circuit portion and a resistance of the current limiting resistor.

5. An electronic control unit according to claim 4, wherein the analog signal inputting circuit portion further comprises a third bypass capacitor inserted between the input signal line and the ground line, an electrostatic capacity (C2) and a parasitic inductance (L2) of the second bypass capacitor, and an electrostatic capacity (C3) and a parasitic inductance (L3) of the third bypass capacitor are set in a range expressed by Equation (3):

$$7 \times 10^6 < 1/[2\pi \sqrt{\{(L2+L3) \times (C2 \times C3)/(C2+C3)\}}] < 35 \times 10^6 \tag{3}$$

6. An electronic control unit according to claim 1, wherein the first bypass capacitor is a chip type ceramic capacitor having an electrostatic capacity of 0.01 to 0.1 µF.

7. An electronic control unit according to claim 6, wherein the second bypass capacitor is a chip type ceramic capacitor having an electrostatic capacity of 500 to 5,000 pF.

* * * * *